United States Patent Office 3,022,183
Patented Feb. 20, 1962

3,022,183
GLASS COMPOSITION
James E. Duncan, Natrona Heights, and William J. Englert, New Kensington, Pa., assignors to Pittsburgh Plate Glass Company, Pittsburgh, Pa., a corporation of Pennsylvania
No Drawing. Filed Apr. 20, 1961, Ser. No. 104,240
6 Claims. (Cl. 106—54)

This invention relates to a glass which is useful as a windshield in high-speed jet aircraft and it particularly relates to a glass for such use which has a lower coefficient of thermal expansion and a higher strain point than conventional lime-soda-silica plate glass.

Jet aircraft operate at such high speeds that the surface temperatures of the windshield become quite high, i.e., about 800° F. or higher. It is required that they have windshields made of a glass which has high strength, a high strain point so as not to lose strength imparted by tempering, a high resistance to thermal shock and good optical properties. Lime-soda-silica plate glass has been conventionally used in aircraft windshields. Extra safety is provided to the windshield by laminating the lime-soda-silica glass with a plastic to produce the conventional "safety glass" type of construction. The plastic of such a laminated structure is not suitable for use in jet aircraft because the temperature of the glass during operation is too high for the plastic to withstand. Tempered plate glass has been used in place of laminated glass to provide increased strength. Tempered glass has its limitations, however, since if the strain point of the glass is too low, the glass loses its temper and consequently its strength. It is, therefore, an object of the present invention to provide a glass which has a relatively high strain point so that the strength of the glass when it is tempered is not lost during use of the glass as a windshield in a jet aircraft.

The glass for the windsheild must also be able to withstand thermal shock which is caused by the rapid changes in temperature of the glass during operation of the aircraft. These differences in temperature result from the rapid changes in speed of the aircraft during acceleration after takeoff and during deceleration for landing. These differences in temperature may also occur in other ways such as when the glass is contacted with moisture in a rain or snow storm. It is, therefore, desirable that the glass have a relatively low coefficient of thermal expansion so that it will have a high degree of resistance to thermal shock. It is recognized, however, that an extremely low coefficient of expansion imposes difficulties in obtaining a high degree of strength by conventional tempering methods. It is, therefore, a further object of the invention to produce a glass which has high strength and also high resistance to thermal shock.

It is a further object of this invention to produce a glass having a high strain point and a high resistance to thermal shock, which has optical clarity, and which can be bent, tempered and coated with an electrically conductive coating in practical sizes according to conventional processes.

A glass which has these properties is a glass which contains in percent by weight 43 to 49 percent $SiO_2$, 7 to 12 percent CaO, 5 to 8 percent MgO, 19 to 26 percent $Al_2O_3$, 4 to 10 percent $B_2O_3$, 6 to 12 percent BaO and 0.1 to 2 percent $Na_2O$. These glasses have a strain point of about 1150° to 1300° F., an annealing point of about 1230 to 1380° F. and a softening point of about 1500° to 1700° F. The glasses have a coefficient of thermal expansion of about 4.4 to $5.6 \times 10^{-6}$ per ° C. from 0 to 300° C. The following compositions are illustrative of the present invention.

| Ingredient | Compositions Percent by Weight | | |
|---|---|---|---|
|  | 1 | 2 | 3 |
| $SiO_2$ | 47.8 | 45.5 | 45.1 |
| $Al_2O_3$ | 20.9 | 19.8 | 24.9 |
| CaO | 9.2 | 9.6 | 9.2 |
| MgO | 7.5 | 5.4 | 6.5 |
| $B_2O_3$ | 5.2 | 8.3 | 5.2 |
| BaO | 7.5 | 10.6 | 6.2 |
| $As_2O_3$ | 1.1 | 0.7 | 1.1 |
| Cl | 1.1 | -------- | 1.1 |
| $Na_2O$ | 1.0 | 0.1 | 1.0 |
|  | 100.3 | 100.0 | 100.3 |
| Less oxygen equivalent | −0.3 | -------- | −0.3 |
|  | 100.0 | -------- | 100.0 |
| Strain Point (° F.) | 1,220 | 1,220 | 1,255 |
| Annealing Point (° F.) | 1,300 | 1,300 | 1,300 |
| Softening Point (° F.) | 1,613 | 1,629 | 1,645 |
| Coefficient of Thermal Expansion $\times 10^{-6}$ per ° C | 4.9 | 4.5 | 4.9 |

The oxygen equivalent of chlorine is set forth in the table because of the manner of calculating the composition of the glass. The chlorine shown in the compositions in the table is understood to be present in the glasses in some combined form but not as a gas. It is not known exactly how the chlorine is combined, but it is probably combined as a chloride such as NaCl.

$SiO_2$ is the primary glass forming ingredient in the glasses of the invention. When more than 49 percent $SiO_2$ is present in the glass, melting difficulties are encountered and less than 43 percent $SiO_2$ tends to raise the devitrification temperature. The preferred amount of $Al_2O_3$ is between 19 and 26 percent. Use of more than 26 percent $Al_2O_3$ causes melting difficulties and use of less than 19 percent $Al_2O_3$ unduly lowers the strain point. Boric oxide aids in melting the glass; however, more than 12 percent $B_2O_3$ causes excessive refractory attack during melting.

It is preferred that the glasses of the invention contain less than 2 percent of $Na_2O$ in order to maintain the coefficient of thermal expansion between 4.4 and $5.6 \times 10^{-6}$ per ° C. Potassium oxide and/or lithium oxide may be substituted for part of the $Na_2O$. In view of the low alkali metal oxide content, the bivalent metal oxides, BaO, CaO and MgO are employed to provide the fluxing action for the glasses. Other bivalent metal oxides, such as ZnO, SrO and PbO, may be employed for the same use. Refining agents such as arsenic trioxide, antimony trioxide, sodium chloride, fluorspar and saltcake may be added. The total amount of refining agents should not exceed about 3 percent by weight of the batch.

The glasses of the invention are made from conventional batch ingredients which include sand, dolomite, aluminum hydrate, barium carbonate, barium nitrate, boric acid, soda ash, potassium carbonate and refining agents. The batch ingredients are thoroughly mixed in proportions necessary to produce the glasses of the invention. Various size pots, or crucibles, can be employed and the temperature and time of melting will vary according to the amount being formed.

The three glass compositions can be made from conventional batch ingredients, as mentioned above, and the following presents the mixtures of the batch ingredients which can be used to prepare those glass compositions.

| Batch Ingredients | To Prepare Glass Composition | | |
|---|---|---|---|
| | 1 | 2 | 3 |
| Sand, pounds | 651 | 648 | 614 |
| Dolomite, pounds | 410 | 360 | 410 |
| Alumina Hydrate, pounds | 432 | 429 | 517 |
| Barium Carbonate, pounds | 94 | 195 | 70 |
| Barium Nitrate, pounds | 50 | | 50 |
| Arsenic Trioxide, pounds | 15 | 10 | 15 |
| Boric Acid, pounds | 126 | 210 | 126 |
| Sodium Chloride, pounds | 25 | | 25 |
| Calcium Carbonate, pounds | | 47 | |

The temperatures and melting conditions herein recited may be employed to make about twelve pounds of glass in a clay pot in a furnace heated by the controlled combustion of natural gas. The empty pot is pre-heated in a furnace at a furnace temperature of about 2400° F. A portion of the mixed batch is ladled into the pre-heated pot, and the furnace temperature is gradually increased. The remaining portion of the batch is ladled into the pot over a period of three and one-half to four hours, and the temperature is raised gradually to about 2700° F. The temperature of 2700° F. is maintained for about two hours, during which time the glass-making materials are melted, the chemical reactions are completed and the glass becomes substantially free of bubbles. During the melting and high temperature reacting periods just described, a neutral or slightly oxidizing atmosphere is maintained within the furnace.

After the glass has become substantially free of bubbles, the temperature of the furnace is lowered in about ¾ of an hour to about 2350° F. The pot of glass is then removed from the furnace, the glass is poured onto a metal table and is rolled into the form of a plate. The plate is placed in a kiln and cooled from 1300° F. to about 1100° F. at the rate of 5° F. per minute. Thereafter, the glass is cooled more rapidly to room temperature. The rough rolled glass is then ground and polished to ¼ inch thickness according to conventional plate glass grinding and polishing techniques.

The ground and polished glass is next inserted in a furnace which is heated to a temperature of about 1550° F. The temperature of the furnace drops as the doors are opened and the glass is inserted. The glass is held in the furnace for 3 to 4 minutes until the furnace temperature recovers to 1440° F. The glass is removed from the furnace and the surfaces are cooled rapidly by directing air at 120° F. and 4½ pounds per square inch pressure against the surfaces for about 30 seconds by means of conventional tempering apparatus such as shown in U.S. Patents Nos. 1,960,220, 1,970,730 and 2,131,406. These conditions may be modified depending upon the size of the furnace and size of the piece of glass being cooled. The glass as thus manufactured is known as tempered glass and has a high degree of strength due to compressive stresses set up in the surfaces of the glass.

The properties of glass No. 1 of the present invention as compared to a commercial lime-soda-silica plate glass are listed below:

| Property | Glass No. 1 | Lime-Soda-Silica Plate Glass |
|---|---|---|
| Strain Point | 1,220° F. | 970° F. |
| Annealing Point | 1,300° F. | 1,040° F. |
| Softening Point | 1,613° F. | 1,340° F. |
| Coefficient of Linear Expansion between 0 and 300° C. | $4.9 \times 10^{-6}$ per °C. | $8.8 \times 10^{-6}$ per °C. |

The strain point is defined as the temperature of the glass at which the iternal stress is substantially relieved in four hours. This point is determined in accordance with ASTM test designation C336–54T. The annealing point is the temperature of the glass at which the internal stress is substantially relieved in 15 minutes. This point is determined in accordance with ASTM test designation C336–54T. The softening point is the temperature at which a uniform fiber of the glass, 0.55 to 0.75 millimeter in diameter at a rate of 1 millimeter per minute when the upper 10 centimeters of its length is heated in a specified furnace at the rate of approximately 5° C. per minute. This point is determined in accordance with ASTM test designation C338–57.

The strengths of a glass of the present invention as compared with the strengths of regular lime-soda-silica plate glass when both are compared in the annealed and fully-tempered conditions are set forth below. The samples are all ¼ inch in thickness.

| Glass | Ultimate Tensile Strength in Pounds Per Square Inch |
|---|---|
| Lime-soda-silica Plate Glass—Annealed | 11,000 |
| Glass No. 1—Annealed | 14,300 |
| Lime-soda-silica Plate Glass—Full tempered | 31,000 |
| Glass No. 1—Full tempered | 36,900 |

Tests were made to compare the loss of temper at various times and temperatures of operating exposure of the glass of the present invention and regular lime-soda-silica plate glass. The figure which was obtained in these tests is the time required to cause a 25 percent reduction in the amount of original temper. The results are as follows:

| Time Required for 25% Reduction of Original Temper | Exposure Temperature, ° F. | |
|---|---|---|
| | Glass No. 1 | Conventional lime-soda-silica plate glass |
| 5 minutes | 1,120 | 900 |
| 1 hour | 990 | 770 |
| 25 hours | 900 | 650 |
| 500 hours | [1] 825 | 590 |
| 1,000 hours | [1] 810 | [1] 757 |

[1] Extrapolated values.

The glass of the present invention was also treated to determine its resistance to thermal shock. The test consisted of determining the temperature drop required to rupture a 2 by 2 by ¼ inch specimen. This was done by heating the specimen to a certain temperature and then immediately plunging the specimen into water maintained at about room temperature.

*Average values of ° F. temperature difference*

| Degree of Temper | Glass No. 1, ° F. | Lime-soda-silica Plate Glass, ° F. |
|---|---|---|
| Annealed | 250 | 170 |
| Full temper | 600 | 535 |

The glasses of the present invention can be bent by conventional flat glass bending techniques. Likewise the glasses can be tempered by conventional tempering techniques. The glasses of the invention can be tempered to a higher degree by using conventional tempering techniques than regular commercial lime-soda-silica glass. This is an unexpected result in view of the fact that the glasses of the present invention have a lower expansion coefficient and higher softening temperature than the conventional lime-soda-silica plate glass. The glasses of the present invention are especially adaptable to receiving transparent electroconductive tin oxide coatings such as those shown in U.S. Patents Nos. 2,614,944 and 2,648,754 of William O. Lytle. The coefficient of expansion of the present glasses makes them especially suited for receiving such coating since the coefficient of expansion of the coatings is about 5 to $6 \times 10^{-6}$ ° C.

Although the present invention has been described with respect to specific details of certain embodiments thereof, it is not intended that such details be limitations on the scope of the invention except insofar as set forth in the following claims.

This application is a continuation-in-part of our application Serial No. 784,454, filed on January 2, 1959, and now abandoned, and entitled "Glass Composition."

We claim:

1. A glass having a strain point of 1150 to 1300° F., and a coefficient of thermal expansion of 4.4 to $5.6 \times 10^{-6}$ per ° C. from 0 to 300° C. and consisting essentially of the following ingredients in percent by weight: 43 to 49 percent $SiO_2$, 7 to 12 percent CaO, 5 to 8 percent MgO, 19 to 26 percent $Al_2O_3$, 4 to 10 percent $B_2O_3$, 6 to 12 percent BaO and 0.1 to 2 percent $Na_2O$.

2. A glass having approximately the following composition in percent by weight: 47.9 percent $SiO_2$, 20.9 percent $Al_2O_3$, 9.2 percent CaO, 6.5 percent MgO, 5.3 percent $B_2O_3$, 7.5 percent BaO, 1.1 percent $As_2O_5$, 1.1 percent Cl and 1.0 percent $Na_2O$, the total exceeding 100 percent by an amount of oxygen stoichiometrically equivalent to the amount of chlorine present.

3. A glass having approximately the following composition in percent by weight: 45.6 percent $SiO_2$, 19.8 percent $Al_2O_3$, 9.6 percent CaO, 5.4 percent MgO, 8.3 percent $B_2O_3$, 10.6 percent BaO, 0.7 percent $As_2O_5$ and 0.1 percent $Na_2O$.

4. A glass having approximately the following composition in percent by weight: 45.2 percent $SiO_2$, 25.0 percent $Al_2O_3$, 9.2 percent CaO, 6.5 percent MgO, 5.2 percent $B_2O_3$, 6.2 percent BaO, 1.1 percent $As_2O_5$, 1.1 percent Cl and 1.0 percent $Na_2O$, the total exceeding 100 percent by an amount of oxygen stoichiometrically equivalent to the amount of chlorine present.

5. An article of manufacture comprising a sheet of glass suitable for use as a windshield in jet aircraft, the glass having a strain point of 1150 to 1300° F. and a coefficient of thermal expansion of 4.4 to $5.6 \times 10^{-6}$ per ° C. from 0 to 300° C. and consisting essentially of the following ingredients in percent by weight: 43 to 49 percent $SiO_2$, 7 to 12 percent CaO, 5 to 8 percent MgO, 19 to 26 percent $Al_2O_3$, 4 to 10 percent $B_2O_3$, 6 to 12 percent BaO and 0.1 to 2 percent $Na_2O$.

6. An article of manufacture comprising a tempered sheet of glass having high strength and high resistance to thermal shock so as to be suitable for use as a windshield in jet aircraft, the glass having a strain point of 1150 to 1300° F. and a coefficient of thermal expansion of 4.4 to $5.6 \times 10^{-6}$ per ° C. from 0 to 300° C. and consisting essentially of the following ingredients in percent by weight: 43 to 49 percent $SiO_2$, 7 to 12 percent CaO, 5 to 8 percent MgO, 19 to 26 percent $Al_2O_3$, 4 to 10 percent $B_2O_3$, 6 to 12 percent BaO and 0.1 to 2 percent $Na_2O$.

References Cited in the file of this patent
UNITED STATES PATENTS

| | | |
|---|---|---|
| 1,968,854 | Pirani et al. | Aug. 7, 1934 |
| 2,010,836 | Adams et al. | Aug. 13, 1935 |
| 2,135,663 | Hanlein et al. | Nov. 8, 1938 |